United States Patent [19]

Perry

[11] Patent Number: 4,807,277

[45] Date of Patent: Feb. 21, 1989

[54] REMOTELY ACTIVATED SWITCHING APPARATUS

[75] Inventor: Steven B. Perry, Highlands, N.J.

[73] Assignee: Keptel, Inc., Tinton Falls, N.J.

[21] Appl. No.: 51,043

[22] Filed: May 15, 1987

[51] Int. Cl.⁴ ............................................. H04M 15/34
[52] U.S. Cl. ........................................ 379/102; 379/8; 379/29
[58] Field of Search ..................... 379/8, 29, 102, 350

[56] References Cited

U.S. PATENT DOCUMENTS

| | | | |
|---|---|---|---|
| 3,773,986 | 11/1973 | Tremblay | 379/8 |
| 4,434,328 | 2/1984 | Fields | 379/8 |
| 4,446,340 | 5/1984 | Fryer | 379/102 |
| 4,485,271 | 11/1984 | Norling et al. | 379/8 |
| 4,536,617 | 8/1985 | Perry | 379/29 |
| 4,550,225 | 10/1985 | Lynch et al. | 379/8 |
| 4,558,182 | 12/1985 | Perry et al. | 379/8 |
| 4,626,632 | 12/1986 | Mazz | 379/29 |
| 4,653,084 | 3/1987 | Ahuja | 379/29 |
| 4,707,850 | 11/1987 | Horton et al. | 379/29 |
| 4,707,851 | 11/1987 | Horton et al. | 379/29 |

FOREIGN PATENT DOCUMENTS 0044161  3/1984  Japan ................................... 379/29

Primary Examiner—Gerald L. Brigance
Assistant Examiner—Richard A. Hjerpe
Attorney, Agent, or Firm—R. G. Rhodes, Jr.

[57] ABSTRACT

Apparatus for disconnecting and reconnecting equipment to a telephone line in response to a signal sent over the telephone line. The apparatus includes a voltage threshold circuit, a voltage regulator circuit and a switching and timing circuit. The switching and timing circuit includes a first energy storage capacitor and a first discharge circuit. The switching and timing circuit further includes a second energy storage capacitor and a second discharge circuit and further includes a third energy storage capacitor and timing resistor. The first discharge circuit includes a first semiconductor switching device and a relay coil of a latching relay. The second discharge circuit includes a second semiconductor switching device and a second relay coil of the latching relay. When a signal is sent over the telephone line which exceeds the threshold level, it is regulated by the voltage regulator and charges up the first, second and third storage capacitors in an order such that the third capacitor charges first, the second capacitor next and the first capacitor last. Once the signal disappears from the telephone line, the first storage capacitor discharges into the first discharge circuit, thereby placing the switch into a first switching state and disconnecting the customer equipment. In this state, a test circuit, for example, may be connected to the telephone line to enable the central office to test the telephone line for faults. After a predetermined time delay determined by the discharge of the third energy storage capacitor into the timing resistor, the second discharge circuit is activated by a voltage differential between the second and third storage capacitors whereby the switch is switched from the first state back to the second state, thereby reconnecting the customer equipment, for example, a telephone, back to the telephone line.

20 Claims, 1 Drawing Sheet

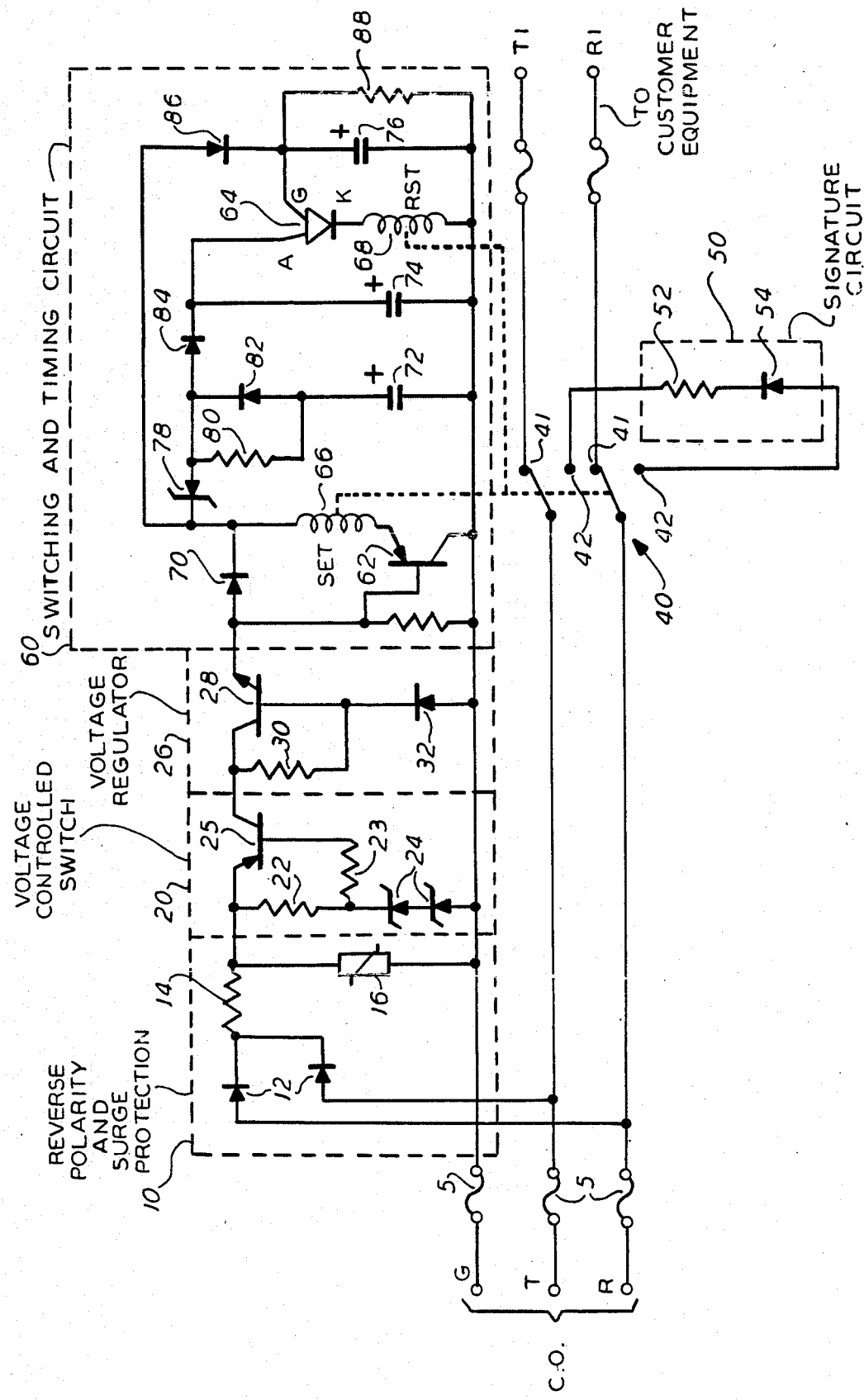

REMOTELY ACTIVATED SWITCHING APPARATUS

BACKGROUND OF THE INVENTION

The present invention relates to apparatus disposed at a first location and activated from a second location over a link connecting the first location and second location. In particular, the present invention relates to telephone remote isolation or disconnect devices. With more particularity, the present invention relates to a remote isolation device for disconnecting a customer device, for example, a telephone located remotely from a telephone central office, and which is activated by a control signal transmitted from the central office to the remote location. Remote isolation devices generally include a switching device which allows the customer equipment to be disconnected from the line in response to a signal transmitted over the telephone line. In some circuits of this type, the customer equipment is reconnected to the line after a time delay or is reconnected to the line in response to a further signal transmitted over the line. The present invention relates to such remote disconnect devices controlled by a direct current control signal and wherein the customer equipment is reconnected to the line a certain time delay after the d.c. disconnect control signal has been transmitted from the central office.

Apparatus connected to a telephone line and a customer's facility for the purpose of disconnecting customer equipment from the line and/or connecting further apparatus to the line in response to a signal sent over the telephone line from the telephone company office are generally known and are referred to as remote isolation or remote disconnect devices. The signal sent from the telephone central office can be d.c., pulsed or a.c., or combinations thereof.

An example of a remote isolation device which is actuated by a d.c. signal transmitted from the telephone central office is disclosed in commonly assigned U.S. Pat. Nos. 4,558,182 and 4,536,617. According to the circuits of these references, a d.c. signal is transmitted from the telephone company central office, the signal is polarity checked, subjected to a voltage protection circuit to protect the circuit from overloads, the d.c. signal is checked to determine if the voltage is above a fixed threshold, and if the voltage is above the threshold, the voltage is regulated to a prescribed voltage by a regulator. The output of the regulator is then supplied to a switching circuit which charges a capacitor during the time period that the voltage is applied to the telephone line. Once the voltage is removed from the telephone line, the capacitor stops charging, and, after a small time delay, the charge on the capacitor causes a transistor to conduct, energizing a relay. The charge on the capacitor, which can be reliably determined by the voltage regulator circuit, keeps the relay energized for a fixed time period. When the relay is energized, the subscriber equipment is disconnected from the line, and an impedance termination circuit, also known as a signature circuit, may be connected across the line. Accordingly, the telephone line can then be tested for the presence of the termination or signature circuit and test results after disconnection can be compared to pre-disconnection test results, thereby aiding in determination of fault location. For example, the central office can check to determine that the telephone line is not open or shorted if the signature circuit is sensed. If the signature circuit is not sensed by the central office, then it can be determined that a fault exists on the telephone line by virtue of the remote disconnect device not switching. If the signature circuit is sensed, it may be determined that a problem exists with the customer equipment or the customer house wiring, and not in the wiring from the central office leading into the customer premises, or alternatively it may be determined that a fault exists on the telephone line which still allows the disconnect device to switch, e.g., a high impedance short.

Since the charge on the capacitor in the device disclosed in the above two patents can be reliably determined, the amount of time during which the relay is energized, and thus the amount of time that the termination or signature circuit is connected across the telephone line is fixed. Once the capacitor discharges, the transistor which causes the relay to energize stops conducting, thus causing the relay to disconnect the signature circuit from the telephone line and reconnect the subscriber equipment.

Remote disconnect devices can also be used to disconnect customers on the occurrence of certain conditions, e.g., nonpayment.

Although the device disclosed in the above-identified patents provides an apparatus by which reliable time delays can be obtained during which the customer equipment used is connected and the signature circuit is connected across the lines, that device requires a large timing and charge storage capacitor. This is because the charge stored up while the d.c. signal is applied by the central office across the telephone line is used to energize the relay continuously until the charge decays and thus determines the time delay during which the relay is energized. The requirement for a large capacitor provides disadvantages in the circuit of the above two patents. For example, the large capacitor is expensive, physically bulky, less reliable than smaller capacitors, leakage is greater, component values are less stable, tolerances are greater, large time delays are not possible because the charge stored in the capacitor is used to energize the relay continuously, and because the capacitor is large, lengthy charging times are necessary. Furthermore, more energy must be transmitted from the central office, thus making designs using large charging capacitors less efficient and making them less useful in situations where severe faults are present on the line.

An alternative circuit in the above two patents utilizes latching relays and smaller charging capacitors. That circuit (see FIG. 5 of U.S. Pat. No. 4,536,617), however, utilizes a first signal of one polarity to disconnect the subscriber equipment and a second signal of another polarity to reconnect it.

SUMARY OF THE INVENTION

It is an object of the present invention to provide a remotely activated switching apparatus for disconnecting equipment at a remote location from a line such as a telephone line in response to a signal sent over the line.

It is a further object of the present invention to provide a remotely activated switching apparatus for disconnecting equipment at a remote location from a telephone line wherein large time delays are possible while still using relatively small capacitive storage elements.

It is yet still a further object of the present invention to provide a remotely activated switching apparatus for disconnecting equipment at a remote location from a telephone line in response to a signal sent over the line which reduces the amount of time in which a charge storage device charges to a prescribed voltage level to operate the apparatus.

It is yet still another object of the present invention to provide a remotely activated switching apparatus wherein equipment located at the remote location is disconnected from the line for a predetermined time period in response to a signal sent over the line.

It is yet still a further object of the present invention to provide a remotely activated switching apparatus for disconnecting equipment located at a remote location from the line for a predetermined time period in response to a signal transmitted over the line wherein lengthy time periods can be obtained, during which testing functions can be preformed from a location disposed remotely from the remote location.

It is yet still a further object of the present invention to provide such a remotely activated switching apparatus which is responsive to a d.c. control signal.

It is yet a further object of the present invention to provide a remotely activated switching apparatus which is more efficient than previous designs by virtue of the fact that less energy transmitted from the central office remote location is necessary to activate the switching apparatus.

It is yet a further object to provide such a switching apparatus which allows switching operation in the presence of more severe line faults than previous designs because less energy from the central office is needed to cause the switching operation.

These and other objects of the present invention are provided by an apparatus adapted to be coupled to a link such as a telephone line and to equipment to connect or disconnect the equipment from the link in response to a signal transmitted on the link from a location remote from the location at which the apparatus is located, the apparatus comprising switch means coupled to the link and to the equipment so as to connect and disconnect the link and the equipment in respective switch states of the switch means, first energy storage means, second energy storage means, third energy storage means, means having an input coupled to receive the signal from the link for providing a predetermined substantially constant signal to the first, second and third energy storage means thereby to charge the first, second and third energy storage means, first de-energizing means coupled to the first energy storage means for de-energizing the first energy storage means, second de-energizing means coupled to the second energy storage means for de-energizing the second energy storage means, the switch means having two switch states and further comprising first and second means for actuating the switch means, the first actuating means placing the switch means in a first of the states and the second acutating means placing the switch means in a second of the states, the switch means being in the first of the states when the first energy storage means is de-energized by the first de-energizing means, and being placed in a second of the states when the second energy storage means is discharged by the second de-energizing means, and further comprising timing means coupled to the third energy storage means for discharging the third energy storage means, whereby, after a time delay, the third energy storage means will actuate the second de-energizing means to discharge the second energy storage means to place the switch means in the second of the states.

Other objects, features and advantages of the present invention will be apparent from the detailed description which follows.

BRIEF DESCRIPTION OF THE DRAWINGS

The invention will be described in greater detail in the following detailed description with reference to the single drawing figure which is a schematic diagram of the remotely activated switching apparatus according to the present invention.

DETAILED DESCRIPTION

With reference now to the drawing, the apparatus of the present invention includes a first group of terminals connected to the incoming telephone line, i.e., to the central office (C.O.) telephone line. These terminals include a Tip (T), Ring (R) and ground (G) line. The ground line may be an earth ground. The incoming central office lines may be connected by fuses 5 to a reverse polarity and surge protection circuit 10. The output of the reverse polarity and surge protection circuit 10 is coupled to a voltage controlled switch circuit 20, which functions to go into conduction only if the input voltage exceeds a predetermined threshold voltage. The output of the voltage controlled switch circuit 20 is coupled to a voltage regulator circuit 26, which functions to regulate the voltage from the voltage controlled switch circuit 20 to a predetermined output voltage. The output voltage from voltage regulator circuit 26 is then coupled to switching and timing circuit 60, which controls switch 40, for example, a relay. Relay 40 may comprise a double pole/double throw relay having one pair of stationary contacts 41 connected to the customer equipment (T1 and R1) and having the other pair of stationary contacts 42 connected to signature circuit 50.

Reverse polarity and surge protection circuit 10 may comprise a pair of diodes 12 which ensure that only a positive voltage applied to Tip or Ring or both with respect to ground can actuate the apparatus. Typically, a 130 volt d.c. signal is applied between Tip and ground or Ring and ground or to both Tip and Ring with respect to ground. The output of rectifiers 12 is coupled by a resistor 14 to a surge protection device 16, such as a varistor. Varistor 16 ensures that, for example, voltage surges, such as lightning spikes, do not damage the circuit and resistor 14 limits surge currents. The polarity checked and surge protected d.c. disconnect signal is then coupled to voltage controlled switch 20. Voltage controlled switch 20 is a voltage-sensitive threshold circuit. The voltage from reverse polarity and surge protection circuit 10 is provided to a series circuit comprising a resistor 22 and zener diodes 24. Illustratively, zener diodes 24 have a combined avalanche voltage of 114 volts. Accordingly, the voltage at the output of the reverse polarity and surge protection circuit 10 must exceed the avalanche voltage of zener diodes 24 in order for these diodes to conduct. Once they conduct, transistor 25, which is fed base drive via resistor 23, goes into conduction. Accordingly, transistor 25 will only conduct when a predetermined threshold voltage, determined by the zener diodes 24, is exceeded. This ensures that voltage spikes, for example, noise below the threshold voltage, are not coupled to the switching and timing circuit 60.

The collector output of transistor 25 is coupled to voltage regulator circuit 26. Voltage regulator circuit 26 comprises a series pass transistor 28 which is fed base drive via a resistor 30. The base of transistor 28 is coupled to ground by a zener diode 32, illustratively having an avalanche voltage of 28 volts. Zener diode 32 determines the output voltage of voltage regulator stage 26. Transistor 28 will go into conduction once zener diode 32 avalanches. Thus, the voltage at the collector of transistor 28 must exceed the avalanche voltage of zener diode 32 by a predetermined amount before transistor 28 will go into conduction. Assuming a sufficiently high voltage is present at the collector of transistor 28 to force zener diode 32 into conduction, voltage regulator 26 will provide a regulated output voltage to switching and timing circuit 60. In the illustrated embodiment, the regulated output voltage is approximately 28.7 volts.

Switching and timing circuit 60 comprises two semiconductor switching devices 62 and 64. Preferably, device 62 comprises a bipolar transistor and switching device 64 comprises a programmable unijunction transistor (PUT). Switching and timing circuit 60 also comprises two relay coils, a set coil 66 and a reset coil 68. The set coil 66 and the reset coil 68 mechanically operate relay contacts 40. Relay 40 comprises a latching type relay, i.e., a relay wherein the relay contacts do not return to their former position once the current stops flowing through the set or reset coils. Accordingly, when current flows through set coil 66, the relay contacts move such that signature circuit 50 is connected to the Tip and Ring lines. The customer equipment across the T1 and R1 lines thus is disconnected from the central office Tip and Ring lines. Once current stops flowing through the set coil 66, the contacts remain in a position such that the signature circuit is connected to the Tip and Ring lines. When the reset coil is activated, the customer equipment is reconnected to the Tip and Ring lines via contacts 41 and the signature circuit is disconnected. Once current stops flowing through the reset coil 68, the customer equipment remains connected to the Tip and Ring lines via contacts 41. Switching and timing circuit 60 operates as follows. Voltage regulator circuit 26 provides a regulated voltage to the base of transistor 62 when an activation signal is present on the incoming telephone lines. This regulated voltage is also coupled through the diode 70 and set coil 66 to the emitter of transistor 62. Accordingly, transistor 62 is maintained in a nonconducting condition when the regulated output voltage is present at the output of voltage regulator 26. While transistor 62 is maintained in a nonconductive condition, capacitors 72, 74 and 76 begin to charge from the regulated voltage. The capacitors charge in a specified order such that capacitor 76 fully charges first, capacitor 74 next and capacitor 72 last. The reason for this order will be explained below. Capacitors 72 and 74 charge only once zener diode 78, illustratively having an avalanche voltage of 8.2 volts, goes into conduction. Capacitor 72 charges through a resistor 80. Capacitor 72 is also coupled to the anode of zener diode 78 via a diode 82, the purpose of which will be explained later. Capacitor 74 charges through zener diode 78 and a further diode 84. Capacitor 76 charges through a diode 86. A timing resistor 88 is also provided in parallel with capacitor 76. PUT 64 has its anode connected to the cathode of diode 84, its cathode connected through reset coil 68 to ground and its gate connected to the cathode of diode 86. As indicated, once a regulated output voltage appears at the output of regulator stage 26, transistor 62 is kept in a nonconducting state. Capacitors 72, 74 and 76 begin to charge. Once the d.c. activation signal is removed from the incoming telephone lines, capacitors 72, 74 and 76 stop charging. After a small time delay, transistor 62 will go into conduction by virtue of the fact that capacitor 72 maintains its charge while the regulated voltage at the base of transistor 62 has now disappeared. Accordingly, capacitor 72 dumps its charge through diode 82 and zener diode 78 into set coil 66, thus energizing the set coil, and placing the signature circuit 50 across the Tip and Ring lines. Resistor 80 ensures that when capacitor 72 is charging, it charges slowly as indicated below, to ensure sufficient charging first of capacitors 74 and 76.

Recall that both capacitors 74 and 76 have also been charged to the output voltage of regulator 26. Once the regulated output voltage disappears, capacitor 76 begins to discharge slowly through timing resistor 88. Meanwhile, capacitor 74 holds its charge, as blocking diode 84 prevents the charge from bleeding through set coil 66 and PUT 64 is in a nonconductive state as yet. Once the voltage across capacitor 76 goes below the voltage across capacitor 74 by approximately 0.7 volt, PUT 64 will go into conduction. Accordingly, the charge across capacitor 74 and 76 will be dumped into reset coil 68, thereby placing relay 40 into the reset mode and connecting the customer equipment to the Tip and Ring lines and disconnecting the signature circuit 50 from the Tip and Ring lines.

Capacitors 72, 74 and 76 charge in a specific order. Capacitor 76 charges most quickly in order to ensure accurate timing. Capacitor 74 charges next in order to ensure that the switching device can be reset, i.e., after disconnection, sufficient charge will be present on capacitor 74 to reset the circuit and reconnect the customer equipment. Capacitor 72 charges least quickly by virtue of series resistor 80 in order to ensure that the timing and resetting functions can be reliably performed by sufficient charging of capacitors 76 and 74.

During the time period when the voltage across capacitor 76 is dropping to more than 0.7 volt less than the voltage across capacitor 74 as determined by the RC constant of capacitor 76 and resistor 88, the central office can test for the presence of signature circuit 50. In the illustrated embodiment, signature circuit 50 may comprise a resistor 52 and a diode 54, as well known in the art, or any other well known signature circuits. During the time period when the signature circuit is connected to the Tip and Ring lines, the central office can test for faults on the line in a known manner. Once capacitor 76 discharges through resistor 88 enough to place PUT 64 in a conductive state, the signature circuit is disconnected and the customer equipment is reconnected to the line, allowing normal use of the telephone or other equipment connected to the telephone line.

Accordingly, there has been described a remotely activated switching apparatus which allows customer equipment connected to a telephone line to be disconnected from the line in response to an activating d.c. signal. The activating d.c. signal allows customer equipment to be disconnected from the line and an alternative circuit, for example, signature circuit 50, to be connected to the telephone line for a prescribed time period. This circuit allows such an operation using relatively small capacitors and thus is highly efficient. Accordingly, the circuit requires little energy transmitted over the line to operate. In an illustrative embodiment, capacitors 72 and 74 each are 22 $\mu f$ and capacitor 76 is 10 $\mu f$. In contrast, in U.S. Pat. Nos. 4,558,182 and 4,536,617, capacitor 78 is approximately on the order of 1000 μf. The use of smaller timing capacitors and latching relays allows longer time-outs, shorter charge times and smaller overall size circuits. The use of latching relays also allows more precise switching times due to the precise nature of the control signals utilized for activating and deactivating the latching relays. Illustratively, resistor 88 is approximately 16 megohms and resistor 80 is approximately 10,000 ohms. PUT 64 may comprise a type 2N6028.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus adapted to be coupled to a link such as a telephone line and to equipment to connect or disconnect the equipment from the link in response to a signal transmitted on the link from a location remote from the location at which the apparatus is located, the apparatus comprising switch means coupled to the link and to the equipment so as to connect and disconnect the link and the equipment in respective switch states of the switch means, first energy storage means, second energy storage means, third energy storage means, means having an input coupled to receive the signal from the link for providing a predetermined substantially constant signal to the first, second and third energy storage means thereby to charge the first, second and third energy storage means, first de-energizing means coupled to the first energy storage means for de-energizing the first energy storage means, voltage threshold means disposed between said first de-energizing means and said first energy storage means whereby said first energy storage means is prevented from charging by a voltage below a predetermined level, second de-energizing means coupled to the second energy storage means for de-energizing the second energy storage means, the switch means having two states and further comprising first actuating means and second actuating means for actuating said switch means, said first actuating means placing said switch means in a first of said states and said second actuating means placing said switch means in a second of said states, said switch means being in the first of said states when said first energy storage means is de-energized by said first de-energizing means, and being placed in a second of said states when said second energy storage means is discharged by said second de-energizing means, and further comprising timing means coupled to the third energy storage means for discharging the third energy storage means, whereby, after a time delay, the third energy storage means will actuate the second de-energizing means to discharge the second energy storage means to place the switch means in the second of the states.

2. The apparatus recited in claim 1 wherein said first energy storage means comprises first capacitor means and said second energy storage means comprises second capacitor means, said switch means being placed in the first of said states when said first capacitor means discharges through said first de-energizing means and being placed in the second of said states when said second capacitor means discharges through said second de-energizing means.

3. The apparatus recited in claim 2 wherein said first de-energizing means and first actuating means are disposed in series and said second de-energizing means and second actuating means are disposed in series.

4. The apparatus recited in claim 3 wherein said first de-energizing means comprises bipolar transistor means.

5. The apparatus recited in claim 3 wherein said second de-energizing means comprises programmable unijunction transistor means.

6. The apparatus recited in claim 2 wherein said second de-energizing means comprises semiconductor switching means having a control input and first and second main terminals, and wherein said third energy storage means comprises third capacitor means coupled to said control input, said third capacitor means being coupled to said timing means comprising resistor means, whereby when a voltage across said third capacitor means falls below a predetermined voltage, said second de-energizing means is switched into a conductive state and activates said second actuating means.

7. The apparatus recited in claim 6 wherein said second capacitor means is coupled to one of said main terminals of said second de-energizing means, whereby when said voltage across said third capacitor means falls a predetermined amount below a voltage across said second capacitor means, said second de-energizing means is placed into a conductive state.

8. The apparatus recited in claim 1 wherein said first actuating means comprises a first relay coil coupled in series with said first de-energizing means whereby when said first deenergizing means is placed into a conductive state, said first actuating means places the switch means into the first of said states, and said second actuating means comprises a relay coil coupled in series with said second de-energizing means, whereby when said second de-energizing means is placed into a conductive state, and second actuating means places said switch means into the second of said states.

9. The apparatus recited in claim 1 wherein said means having an input coupled to receive the signal from the link for providing a predetermined substantially constant signal to the first, second and third energy storage means comprises voltage regulator means.

10. The apparatus recited in claim 9 wherein the first de-energizing means enables said first energy storage means to energize when the voltage across said first energy storage means is less than the voltage at the output of said voltage regulator means and to de-energize when the voltage across said first energy storage means is greater than the voltage at the output of said voltage regulator means.

11. The apparatus recited in claim 9 further comprising voltage controlled switch means interposed between the regulator means and the link for providing an energizing signal exceeding a predetermined energy level to the regulator means only when the signal on the link exceeds the predetermined energy level.

12. The apparatus recited in claim 11 further comprising rectifier means interposed between said voltage controlled switch means and the link whereby only a signal of a predetermined polarity on the link will be supplied to said voltage controlled switch means.

13. The apparatus recited in claim 12 further comprising surge protection means for protecting said apparatus from voltage transients on the link.

14. The apparatus recited in claim 1 wherein said first actuating means comprises a first latching relay coil and said second actuating means comprise a second latching relay coil.

15. The apparatus recited in claim 14 wherein said switch means comprises relay contact means.

16. The apparatus recited in claim 1 further comprising resistance means coupled in series with said first energy storage means to allow said first energy storage means to charge according to a predetermined time constant.

17. The apparatus recited in claim 16, further comprising first diode means disposed in parallel with said resistance means and in series with said first energy storage means to allow said first energy storage means to discharge quickly through said first de-energizing means.

18. The apparatus recited in claim 17, further comprising second diode means coupled in series with said second energy storage means for preventing said second energy storage means from discharging through said first de-energizing means.

19. The apparatus recited in claim 18, further comprising third diode means coupled in series with said third energy storage means for preventing said third energy storage means from discharging through said first de-energizing means.

20. The apparatus recited in claim 1, wherein said third, second and first energy storage means charge in a predetermined order such that said third energy storage means charges to its peak level first, said second energy storage means charges to its peak level second and said first energy storage means charges to its peak level last.

* * * * *